Aug. 17, 1937.   F. R. BICHOWSKY   2,090,466
MEANS FOR HUMIDIFYING AND DRYING AIR
Filed March 30, 1935
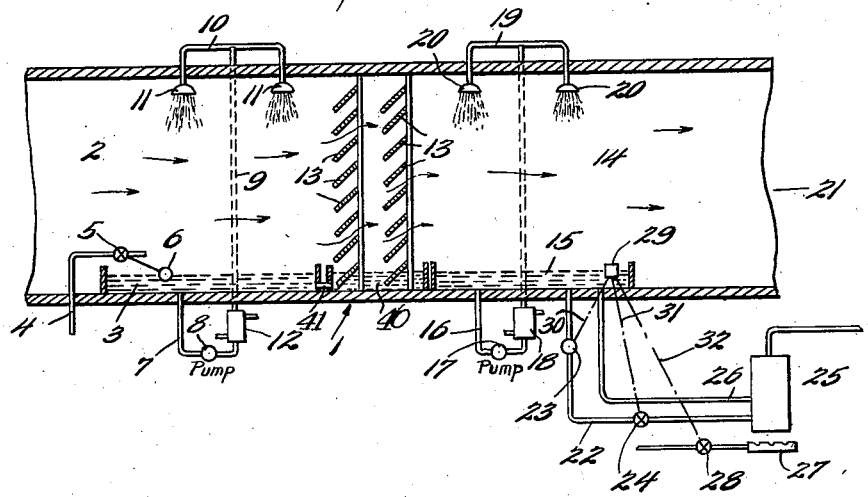
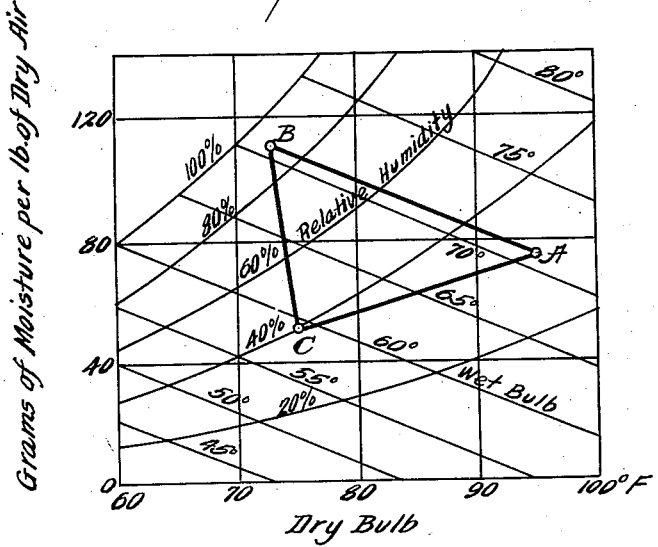
Inventor
Francis R. Bichowsky,
Attorney Patented Aug. 17, 1937

2,090,466

UNITED STATES PATENT OFFICE 2,090,466

MEANS FOR HUMIDIFYING AND DRYING AIR

Francis R. Bichowsky, Toledo, Ohio

Application March 30, 1935, Serial No. 13,966

3 Claims. (Cl. 183—120)

This invention relates to a means for conditioning fluids and more particularly to improved means for conditioning air. The invention relates to a system wherein the air is humidified and then treated with a liquid drying agent to produce the desired conditioning.

It is an object of this invention to provide an improved apparatus in which air to be conditioned is first cooled and humidified by contacting it with a water spray and then dried by contacting it with a drying liquid.

It is a further object of the invention to provide improved air conditioning apparatus permitting use of smaller drying towers than have previously been employed for a like purpose.

A further object of the invention is the provision of a system in which air is contacted with and cooled by a water spray and thereafter contacted with a widely diffused liquid drying agent the concentration of which is maintained.

It is a further object of the invention to provide a system wherein the necessary amount of contact surface of liquid drying agent is less and the power necessary to move air through the system is less, than has been the case in systems heretofore employed.

Further objects and advantages will be apparent from the following detailed description and from the drawing forming a part of this specification.

In the drawing:

Fig. 1 is a diagrammatic illustration of one embodiment of the invention.

Fig. 2 is a psychrometric chart having indicated thereon an example of a mode of operation.

In Fig. 1 of the drawing, the air conditioning apparatus 1, has a humidifying chamber 2. This chamber is equipped with a tank or sump 3 containing a body of water originally supplied thereto from the source of water supply 4, through valve 5, connected to and controlled by the position of float 6. The float valve control is so arranged as to maintain the water in the tank or sump 3 at a predetermined level in keeping with the needs of the apparatus. Water is removed from the vessel or sump 3 by a pipe 7, connected with a pump 8 which supplies the water through pipes 9 and 10, to spray nozzles 11 or equivalent diffusing means located in the upper part of the chamber so that the water being sprayed will contact in its descent with the stream of air passing through the chamber. The sump 3, in addition to serving as a supply for the recirculating stream of water, serves to collect the descending water spray which is not evaporated by the air.

The air which is to be conditioned, passing through the apparatus, will contact with the fine-
ly divided stream of water and become humidified and at the same time cooled because of the evaporation of the water. The temperature of the water being circulated may be lowered if desired by means of the interchanger or cooler 12. Eliminator vanes 13 serve to remove suspended water droplets from the stream of cooled and humidified air passing from the humidifying chamber through the vanes into drying compartment 14. Water which may be gathered by the vanes 13 is returned to the sump 3 by way of the auxiliary sump 40 and the pipe 41.

The drying compartment of the apparatus has at its bottom a collection and supply tank or sump 15 wherein is stored a quantity of hygroscopic liquid. Pipe 16 connects the sump 15 with pump 17 which supplies liquid through the interchanger or cooler 18 by the pipe connection 19, to the spray nozzles 20, or other equivalent diffusing means located in the upper part of the chamber. The drying liquid descends in a finely divided stream in the form of drops to contact with the stream of air passing through the compartment. The liquid and absorbed moisture extracted from the humidified air returns to the sump 15 for recirculation by the means already described.

The interchangers 12 and 18 may be of any form and any well known cooling means may be employed, but usually in practice water is employed for cooling. It will also be understood that the supply of cooling medium to the cooler may be controlled by a valve and a thermostatic control device placed in the chamber where the air is used or otherwise located in the system.

The air is dried in the drying compartment in an amount depending upon the nature of the drying agent, its concentration and temperature, the structure of the chamber, and on the amount of surface of the drying liquid exposed to the air stream. The dried air leaving the compartment 14 by the outlet 21, may be further conditioned by means not forming a part of this invention.

Contacting the finely divided stream of liquid drying agent with the humidified air in the drying compartment may materially affect the concentration of the liquid drying agent, especially after continued use unless means are provided to maintain the concentration of the liquid within predetermined limits. In the apparatus illustrated, a pipe 22 connects the vessel or sump through a pump 23 and an automatic valve 24 to a regenerator 25 adapted to boil off the water taken up by the drying liquid in contacting the air. The concentrated liquid is returned to the sump by pipe 26. The regenerator is supplied with heat from burner 27, which may be connected to a fluid fuel supply line under control of the electrically operated valve 28. A control means 29, responsive to variation in density or concentration of the drying liquid, is located in the vessel or sump 15 and is shown diagrammatically connected, by electric circuits 30, 31 and 32, with the pump 23, valve 24, and the fuel supply valve 28. Changes in the density of the liquid in the sump 15, beyond predetermined limits, will result in operation of the control means to energize the automatic valve, pump, and fuel supply valve to obtain regeneration of the drying liquid to a predetermined degree of concentration after which the liquid circuit and heating means may be cut off by the control means. By this arrangement of apparatus, liquid within the sump is automatically maintained at concentrations between predetermined limits.

The operation and advantages of the invention will be more readily understood by reference to the psychrometric chart of Fig. 2, whereon is indicated one mode of operation under a particular set of conditions such as frequently occur in the practice and use of the invention. The invention, however, is not in any way limited to the particular conditions selected for illustration. In the illustrated example, the air to be conditioned is in its initial state at a temperature of 95 degrees and a relative humidity of 30%. This state of the air is shown by point A on the chart. In passing such air through the humidifying chamber 2, the state of the air will change due to evaporation along the line of constant wet bulb, which is also the line of constant heat to some point, as B, the temperature of the air falling to 73 degrees and the humidity rising to 90%. The air at state B is caused to move into the drying compartment or tower 14, and in the illustrated example, is dried to a relative humidity of 40%, with a temperature of 75 degrees, or, as illustrated on the chart, it is dried to the state C. In this process, heat is given to the drying liquid due to the heat of absorption of water vapors by the liquids. Since the total heat content in evaporation along the line of constant wet bulb is neither added to or reduced, the net amount of heat that must be removed from the air by the liquid drying agent is exactly the same in this mode of operation, excepting some minor losses, as if the air were dried and cooled at the same time directly from the state A to the state C. From the point of view then of the amount of heat that is to be removed, this process of the invention offers no marked advantage over the direct method of drying the air with the cool drying agents. However, it is a characteristic of liquid drying agents either exposed over a packing or in the form of spray, that less surface is required to remove a given quantity of heat from gases by absorbing water in the drying agent than is required to remove a given quantity of heat by conduction of heat from the gas to the liquid drying agent. It therefore proves it is practical by this manner to use towers of much smaller construction to cool and dry air than would be employed if it were necessary to cool and dry the air at the same time in the same type of tower. Since if the air is conditioned in accordance with my invention the amount of exposed surface of liquid drying agent is less than in the usual way, that is, in accordance with the methods heretofore employed, not only may the drying chamber be smaller than with the previous practice, but they may be designed with less resistance to the flowing air so that less power will be necessary to move the air to be conditioned through the drying spaces in the apparatus of the invention when operating than is required in apparatus heretofore employed.

In the apparatus hereinabove described, it will be noted that air circulated through the apparatus first becomes humidified by contacting the air with a finely divided spray of water constantly recirculated from a supply in the bottom of the humidifying chamber. The volume of water available for recirculating purposes is maintained constant by the operation of the float-controlled valve. The eliminator vanes serve to separate any droplets of water from the humidified air in its passage from the humidifying compartment to the drying compartment. In this drying compartment, the air is contacted with a drying liquid which is being constantly recirculated. This drying liquid is maintained at a condition of predetermined concentration and temperature, the temperature characteristic being maintained by the operation of the cooler associated with the recirculating circuit for the drying liquid. The concentration of the liquid is maintained between predetermined limits in accordance with the condition of the liquid in the sump of the drying chamber. This operation is automatic.

It will be obvious to those skilled in the art that the apparatus described may be used in conjunction with other air conditioning apparatus or may form a part thereof. It will also be apparent that the apparatus is such that it may be included in any air recirculating system.

While the invention is hereinabove described in connection with the preferred embodiment, it is to be understood that the words which have been used are words of description rather than of limitation, and that changes within the purview of the appended claims may be made without departing from the true spirit and scope of the invention in all its aspects.

I claim:

1. An apparatus for conditioning air comprising, a chamber in which air is cooled and humidified by evaporation of water, means for continuously supplying water in finely divided state to contact the air in said chamber, a drying compartment connected to receive humidified air from said chamber, means for continuously supplying liquid drying agent of substantially constant concentration in finely divided state to said compartment to remove water vapor from the humidified air, said last mentioned means including means for collecting the liquid drying agent and condensed water from said compartment, means for regenerating the liquid, in said collecting means, to maintain a predetermined concentration and temperature of the liquid, and means responsive to changes in concentration of the drying liquid to control operation of the regenerating means.

2. In combination with an air conditioning apparatus having humidifying and drying chambers, a water tank at the bottom of the humidifying chamber, means for circulating and spraying into the upper part of the humidifying chamber water from the tank, means for cooling water in circulation, a collecting and storage tank in the lower part of the drying chamber, spraying means in the upper part of the drying chamber, means for circulating from the last mentioned tank through the spraying means liquid drying agents having substantially constant concentration and temperature, and means connected with the storage tank for maintaining the concentration of the liquid drying agent within predetermined limits.

3. An apparatus for conditioning air wherein the air is first humidified and then dehumidified comprising in combination a humidifying chamber, means for collecting and recirculating water in said chamber whereby to maintain the water temperature substantially at the wet bulb temperature of the air and whereby to provide adiabatic cooling and humidification of an air stream passing through the chamber, and means operating in accordance with the water level in said water collecting means to maintain a substantially constant volume of water in the water circuit, a drying chamber, means for collecting and recirculating a liquid drying agent in said drying chamber, means for regenerating said liquid drying agent, and means operative in accordance with variations of the density of said drying agent and arranged to control said regenerating means whereby to maintain a substantially constant density of the liquid drying agent in its collecting means, and an eliminator interconnecting said chambers arranged to remove excess water from the air passing from the humidifying to the drying chamber and arranged to restore said removed liquid to the water collecting means.

FRANCIS R. BICHOWSKY.